United States Patent [19]

Singh

[11] Patent Number: 5,048,978
[45] Date of Patent: Sep. 17, 1991

[54] SQUEEZE FILM DAMPER SEAL

[75] Inventor: Anant P. Singh, Cincinnati, Ohio

[73] Assignee: General Electric Company, Cincinnati, Ohio

[21] Appl. No.: 640,786

[22] Filed: Jan. 14, 1991

[51] Int. Cl.⁵ .............................................. F16C 27/00
[52] U.S. Cl. ..................................... 384/99; 384/130
[58] Field of Search ................. 384/99, 535, 581, 124, 384/130, 152, 153, 477, 489

[56] References Cited

U.S. PATENT DOCUMENTS

| | | | |
|---|---|---|---|
| 4,213,661 | 7/1980 | Marmol | 384/99 |
| 4,337,983 | 7/1982 | Hibner | 384/99 |
| 4,772,135 | 9/1988 | Griguscheit | 384/99 |
| 4,867,655 | 9/1989 | Barbic et al. | 384/99 X |

OTHER PUBLICATIONS

"Experimental Measurement of the Dynamic Force Response of a Squeeze Film Damper," Vance & Kirton, *Transactions of the ASME*, Nov. 1975, p. 1283.

Primary Examiner—Thomas R. Hannon
Attorney, Agent, or Firm—Jerome C. Squillaro

[57] ABSTRACT

A shaft damper bearing utilizing spaced apart piston ring seals to seal off an annular squeeze film space between the rings, includes diagonal cross-section ring grooves in the bearing housing with diagonal cross-section rings in the housing grooves adapted to engage a bearing support undergoing radial motion in the housing.

10 Claims, 1 Drawing Sheet

SQUEEZE FILM DAMPER SEAL

BACKGROUND OF THE INVENTION

This invention relates to an improved squeeze film damper seal and more particularly to an improved piston ring seal and groove combination for squeeze film dampers as associated with high speed turbo machinery, for example, hot gas turbine engines such as aircraft gas turbine engines.

In a typical squeeze film shaft damper arrangement, a shaft with its associated rolling element bearing are permitted to have some limited radial motion in the supporting bearing housing. Ordinarily the annular outer race of a rolling element bearing closely fits in an annular chamber in the support housing where two opposing closely adjacent circumferential surfaces of the housing and race define a thin annular squeeze film space into which an oil under pressure is introduced for damping action on the race. The race is fitted with spaced apart concentric piston ring type seals which circumferentially engage the bearing housing to seal off the squeeze film space between the rings. One problem with dampers as described, is sealing of the fluid film squeeze film space by means of the described piston ring seals under the known variable operating conditions of the damper. For example, the noted variable operating conditions include fluid pressure fluctuations adjacent the rings which lead to sealing instability of the rings with excess damper fluid leakage and compromised damper effectiveness.

OBJECTS OF THE INVENTION

It is an object of this invention to provide improved piston ring sealing in a piston ring sealed squeeze film damper.

It is another object of this invention to provide an improved piston ring and groove combination in a piston ring sealed squeeze film damper.

It is a further object of this invention to provide an improved diagonal surface piston ring and groove location for piston ring sealed squeeze film dampers.

SUMMARY OF THE INVENTION

An improved piston ring and groove arrangement comprises a diagonal cross-section piston ring groove located in a squeeze film damper housing with a diagonal surface cross-section piston ring in the housing groove and adapted to engage a bearing support race to seal a squeeze film space between the race and the housing.

This invention will be better understood when taken in connection with the following description and drawings.

DESCRIPTION OF PREFERRED EMBODIMENTS

Figure 1:
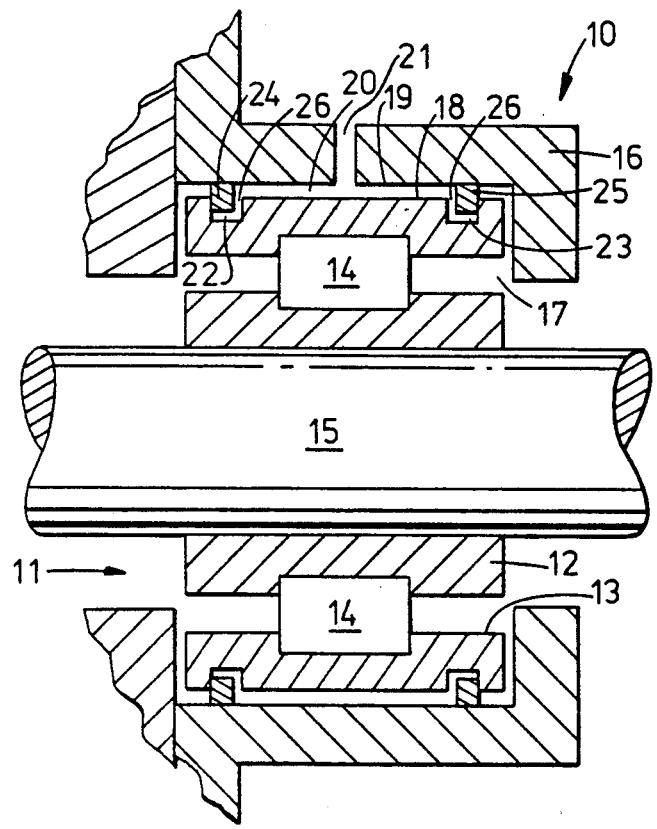
FIG. 1 is a partial schematic and cross-sectional illustration of a piston ring sealed squeeze film damper.

Referring now to FIG. 1, a squeeze film damper assembly 10 is combined with a rolling element bearing assembly 11 such as associated with high speed turbo machinery, for example, hot gas turbine engines and aircraft gas turbine engines. Bearing assembly 11 comprises an annular inner race 12 and a spaced outer annular race 13 with rolling elements 14 therebetween. Inner race 12 is fitted on a rotor shaft 15 so that inner race 12 rotates, with shaft 15, on rolling elements 14. A supporting housing 16 for bearing assembly 11 includes an annular chamber 17 therein, and outer race 13 is fitted or positioned in chamber 17 for limited radial motion therein. The outer circumferential and planar surface 18 of race 13 is closely adjacent an opposite circumferential and planar surface 19 of housing 16 to define a thin annular damper squeeze film space 20 therebetween. A damper fluid such as an oil under pressure, is introduced into damper squeeze film space 20 through an appropriate conduit or inlet 21 in housing 16.

Upon rotation of shaft 15, as a turbine rotor shaft, for example, any shaft rotor imbalance may cause shaft 15 and, bearing assembly 11 therewith, to undergo radial motion and subject oil in damper space 20 to very high pressure to force viscous flow of the oil and a damping action on race 13 of bearing assembly 11. In order to seal damper oil in squeeze film space 20, race 13 includes a pair of spaced apart concentric grooves 22 and 23 in its outer surface 18 with squeeze film space 20 therebetween. A pair of gap piston rings 24 and 25 are fitted in grooves 22 and 23 respectively and adapted to peripherally engage circumferential wall 19 of chamber 17 to seal off squeeze film space 20.

In the arrangement as described, oil under pressure from damper squeeze film space 20 is utilized to assist ring and groove sealing. For example, each ring and groove combination is of a predetermined size to provide a narrow open circumferential side vent space 26 as a part of each groove and circumferentially adjacent squeeze film space 20. Accordingly, each vent space 26 is in direct fluid flow relationship with squeeze film space 20, and, as a result, high pressure in squeeze film space 20 is transmitted to vent space 26 where it is exerted against the adjacent side of a ring in its groove to urge the ring into firmer sealing relationship with its opposite groove wall. However, favorable sealing effects of vent spaces 26 are somewhat offset by a noted disadvantage. A vent space 26, having a fluid thickness significantly greater than that of squeeze film space 20, comprises an unconstrained boundary for squeeze film space 20 which causes a concurrent decrease in squeeze film pressure axially along squeeze film space 20 approaching its boundary, and a resultant loss of damper effectiveness. The improved ring and groove sealing arrangement and structure of this invention does not require or utilize a vent space and therefore obviates a vent space and its deleterious effect. Such an arrangement and structure is more clearly illustrated in FIG. 2 where parts similar in design and function to those of FIG. 1 bear the same numerals.

Figure 2:
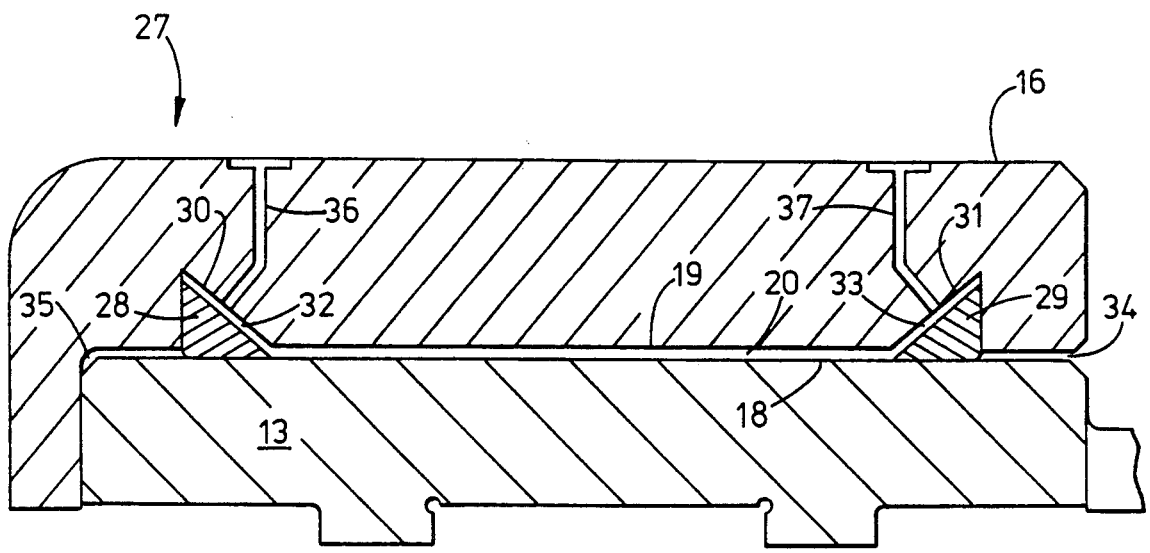
FIG. 2 is a partial schematic and cross-sectional illustration of a pertinent region of a piston ring sealed squeeze film space employing the improved piston ring and groove arrangement, location and structure of the present invention.

Referring now to FIG. 2, a squeeze film section 27 of a squeeze film damper includes a bearing race 13 cooperating with bearing housing 16 to define a damper squeeze film space 20 which is bounded or sealed by spaced apart gas type piston rings 28 and 29 of diagonal surface cross-section, for example, triangular or trapezoidal. In this instance, and as further differentiated from the FIG. 1 damper assembly, piston ring grooves 30 and 31 are formed in housing 16 so that rings 28 and 29 peripherally engage the circumferential surface 18 of race 13 to seal squeeze film space 20 between rings 28 and 29.

An immediate and major advantage of the described combination of ring and groove configuration and housing location is the elimination of the vent spaces 26 of FIG. 1 with their inherent disadvantages. Removal of piston ring grooves from outer race 13 not only avoids the introduction of stress concentration areas of a groove in the otherwise smooth and uninterrupted outer surface of race 13, but also the absence of a groove contributes to an increase in bearing fatigue life. Moreover, each ring and its groove have a complementary diagonal cross-section where the complementary diagonal surfaces of a ring and its groove are in spaced apart relationship to define diagonal fluid filled spaces or zones 32 and 33 having an oil film thickness no greater than the thickness of the squeeze film space 20 to which the zones are directly exposed in fluid flow relationship. Piston seal rings 28 and 29 have a diagonal cross-section, which, in the form disclosed, is a right triangle cross-section. Other diagonal cross-sections may include trapezoidal and other suitably modified polygonal and truncated geometrical figures, all of which may provide a large slant or diagonal surface spaced from a corresponding groove surface to define high pressure oil filled diagonal zones. As illustrated in FIG. 2, the spaced apart pair of diagonal cross-section rings 28 and 29 are positioned in what may be described as inverted right triangular grooves not only to conform to the triangular ring cross sections, but also so that, with the defined diagonal zone, one of the sides of the triangle ring projects from its groove to peripherally engage surface 18 of race 13. Grooves 30 and 31 have a diagonal defining apex which projects radially into circumferential wall 19 of housing 16, and the opposite ring diagonals, of the pair of rings 28 and 29, and wall diagonals, of the opposite grooves 30 and 31, are directed towards or face each other across squeeze film space 20, i.e. the ring cross-sections as shown in FIG. 2, are reversed one with respect to the other. Also, as illustrated in FIG. 2, squeeze film space 20 is bordered or bounded by rings 28 and 29 but the opposing housing and race structures 16 and 13 respectively extend to define open end bumper squeeze film spaces 34 and 35 which are adjacent a ring opposite to squeeze film space 20 of the damper. In this invention, housing 16 has a radial thickness at the bumpers greater than its thickness at squeeze film space 20 so that the bumper squeeze film spaces 34 and 35 are of less thickness than the thickness of squeeze film space 20.

Bumper portions 34 and 35 receive a supply of oil from leakage past gap rings 28 and 29 and function as a squeeze film adjunct. Damper oil from open ended bumpers 34 and 35 is subsequently collected for treatment, such as cooling, and recirculated into squeeze film space 20. Bumper spaces 34 and 35 are advantageously provided in the present invention by reducing the internal diameter of housing 16 at the bumper regions without any need to interrupt the smooth outer surface of race 13. Any adjustment of bumper space 34 or 35 may be accomplished by housing modification rather than modifying the usual hard metal race 13.

As illustrated, the vertical vent spaces or dams 26 of FIG. 1 are absent in FIG. 2, having been replaced with diagonal zones 32 and 33 which do not represent unconstrained boundaries for squeeze film space 20, and therefore assist in maintaining a more constant and higher pressure axially along squeeze film space 20. During operation of a damper of this invention, oil in diagonal zones 32 and 33 is uncavitated, and hydrodynamic oil pressure in these zones bears on the diagonal surfaces of rings 28 and 29 to press the rings both laterally and vertically for more effective sealing of the rings laterally with their groove wall, and peripherally with race 13. Replacement of vertical spaces 26 with diagonal zones 32 and 33 represents what may be described as an additional width effectiveness of squeeze film space 20 without an actual increase in physical dimensions.

The improved piston ring seal of this invention may be provided with an interrelated oil delivery or supply system which cooperates with diagonal zones 32 and 33 of FIG. 2 not only for an improved oil supply but also for use of the oil supply for additional sealing of the piston ring seals. Such an improved oil delivery system is also illustrated in FIG. 2.

Referring again to FIG. 2, an oil delivery system includes a supply of damper oil under pressure (not shown) and appropriate damper oil inlet conduits 36 and 37 leading from a supply of oil under pressure (not shown) directly into diagonal zones 32 and 33 intermediate their ends where inlet oil is immediately brought to bear against the diagonal surfaces of the rings to press the rings laterally against a groove wall and radially against race 13 for more efficient oil conservation.

In the oil supply system of this invention, inlet oil and inlet oil pressures are utilized to effectuate sealing of the damper during entry of the oil for efficient oil conservation. Furthermore, the structure and arrangement of rings and grooves of this invention facilitates the generation of hydrodynamic oil pressure in circumferential zones 32 and 33 which also acts on the tapered surfaces of the rings for improved lateral and radially inward sealing forces. A significant positive pressure at oil inlet passages 36 and 37 (FIG. 2) during operation of the damper of this invention, minimizes back flow of oil into the cavitated middle part of squeeze film space 20. Preferably oil inlet passages 36 and 37 each represent a plurality of such passages spaced circumferentially about race 13 and rings 28 and 29.

The improved damper arrangement of FIG. 2 combines a number of desirable functions in a single damper. For example, the squeeze film space 20 between rings 28 and 29 functions with an uninterrupted and uniform oil thickness simulating what is referred to as "long bearing" performance. The reduced film thickness in the bumper portions 34 and 35 permit the bumper portions to function under what is referred to as open-ended short bearing performance. Additionally, damper oil in diagonal zones 32 and 33 is uncavitated during damper operation and tends to suppress oil cavitation in space 20. These desirable functions provide an increased effective damper length without an increase in physical dimensions.

This invention is applicable to various damper configurations other than that of FIG. 1, as well as to hydrodynamic bearings generally, which may use piston ring sealing.

While this invention has been disclosed and described with respect to a preferred embodiment thereof, it will be apparent to those skilled in the art that various changes and modifications may be made without departing from the spirit and scope of the invention in the following claims.

What is claimed is:

1. In a squeeze film shaft damper in which a bearing supported shaft has an annular bearing support fitted in an annular chamber in the bearing housing for limited radial motion therein, and where the annular bearing support and an opposed circumferential wall of said annular chamber define a thin annular oil filled damper squeeze film space therebetween, the improvement comprising (a) a pair of spaced apart concentric grooves in said bearing housing circumferential wall with said damper squeeze film space therebetween, (b) said grooves having a diagonal cross-section, (c) a pair of piston ring seals in said grooves and adapted to sealingly engage said bearing support, (d) said piston ring seals having a complementary diagonal cross-section to fit in said grooves in interfitting relationship to define a diagonal zone between the groove and ring diagonals with the diagonal of said diagonal cross-section of each ring facing in a direction towards each other.

2. The invention as recited in claim 1 wherein oil delivery means is connected to deliver oil under pressure directly into the said diagonal zones.

3. The invention as recited in claim 1 wherein said diagonal zones have one end thereof in fluid flow communication with said damper squeeze film space.

4. The invention as recited in claim 1 wherein oil delivery means is connected in said housing to deliver oil, directly to said diagonal zones intermediate their ends.

5. The invention as recited in claim 1 wherein oil delivery means is connected to said diagonal zones at a plurality of circumferentially spaced locations.

6. The invention as recited in claim 1 wherein said diagonal cross-sections are triangular cross-sections.

7. The invention as recited in claim 1 wherein said diagonal cross-sections are trapezoidal.

8. The invention as recited in claim 1 wherein said diagonal zones of said rings and grooves are directed towards each other.

9. The invention as recited in claim 1 wherein said annular bearing support and said housing define a bumper squeeze film space therebetween adjacent each said ring and opposite said squeeze film space.

10. The invention as recited in claim 9 wherein the radial thickness of said bumper squeeze film space is less than the radial thickness of said damper squeeze film space.

* * * * *